May 17, 1960

L. E. LE MAT ET AL 2,936,611

LEAK TESTING SYSTEM

Filed Jan. 16, 1959

INVENTORS
LEE E. LeMAT
ROBERT T. SULLIVAN

ATTORNEYS

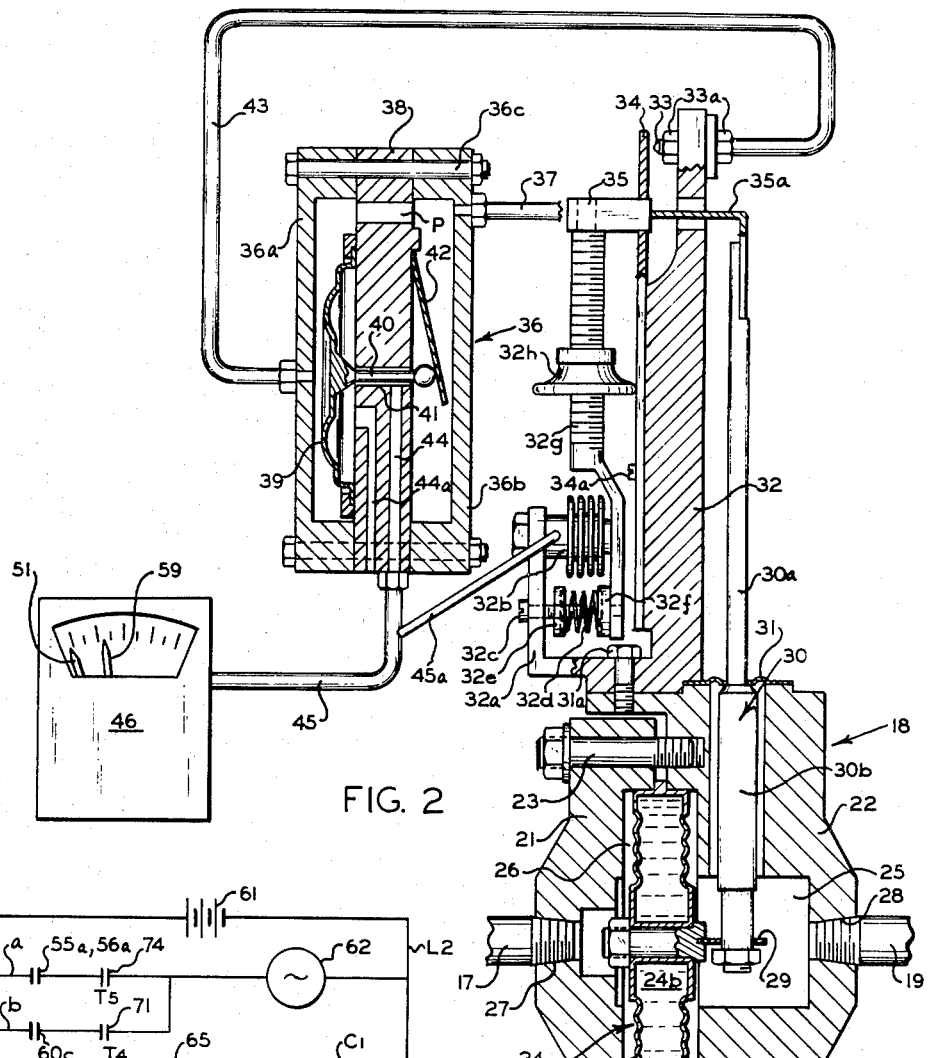
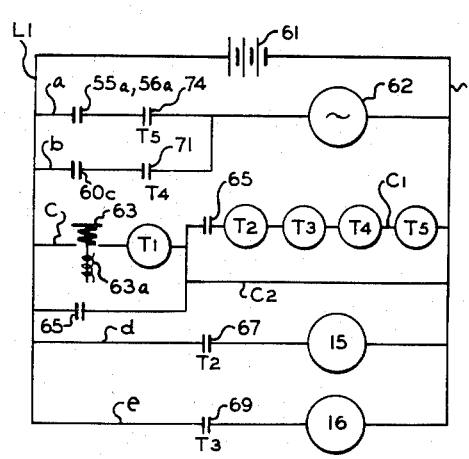
FIG. 2
FIG. 5
INVENTORS
LEE E. LeMAT
ROBERT T. SULLIVAN
ATTORNEYS May 17, 1960  L. E. LE MAT ET AL  2,936,611
LEAK TESTING SYSTEM Filed Jan. 16, 1959  3 Sheets-Sheet 3

INVENTORS
LEE E. LEMAT
ROBERT T. SULLIVAN

ATTORNEYS

United States Patent Office 2,936,611
Patented May 17, 1960

2,936,611

LEAK TESTING SYSTEM

Lee E. Le Mat and Robert T. Sullivan, Saginaw, Mich.

Application January 16, 1959, Serial No. 787,254

6 Claims. (Cl. 73—49.2)

This invention relates to a leak testing system for checking the porosity of various parts such as hydraulic pumps, transmission cases, master cylinders, and radiators at a mass production tempo.

Various testing systems are known and commercially in use wherein air under pressure is applied to the part, after which the application of air is discontinued and the decrease in the pressure of the air, if any, is utilized to indicate that the part does not meet a predetermined standard or to operate suitable mechanism for discarding the unit under test. Present day systems have, however, certain disadvantages which have limited their use. Firstly, they have not been accurate enough for many potential customers because with acceptable commercial instruments it is considered impossible to measure a pressure drop which is below 1 p.s.i. If present commercial systems were employed to test parts which are required to be substantially impervious, parts would pass the inspection which are not up to the acceptable standard. Because of this limited accuracy the use of known systems has been restricted to measuring the porosity of parts which do not require what we term a high degree of impermeability.

Further, known systems employ instruments to pick up a drop in pressure which tend to hunt and the result is that once the air is charged to the part, a long settling time is required before the actual test can be made. Aside from the fact that a longer settling time in such systems is not desirable from the standpoint of efficiency, the use of longer settling times introduces a problem concerned with ambient temperatures. Since the part is seldom the same temperature as the air charged to it, if the air is allowed to settle for any length of time it assumes the temperature of the part and its pressure may be affected sufficiently so that the system will indicate a leak.

Still a further problem encountered with present day systems is the fact that when an extremely bad part is being tested which fails to hold any pressure, it will be passed by commercially available systems of which we are aware.

One of the prime objects of the instant invention is to provide a porosity testing system which is extremely accurate and will respond to a pressure drop of as little magnitude as one sixteenth of an inch of water (or .002 p.s.i.) as well, of course, as to greater pressure drops so that parts requiring a high degree of permeability can for the first time be accurately checked pneumatically.

Another object of the invention is to provide a system which does not employ a reference charge pressure and does not require a long settling time so that the air in the part does not heat or cool sufficiently to affect the pressure of the air charged to the part.

A further object of the invention is to provide a system which rejects very bad parts having open holes or the like even though the part will not fill with air under pressure.

Still another object of the invention is to provide a system of the character described which can charge liquid under pressure to the part to be tested as well as air or another gas.

Other objects and advantages of the invention will be pointed out specifically or will become apparent from the following description when it is considered in conjunction with the appended claims and the accompanying drawings, in which:

Figure 2 is a sectional, side elevational view illustrating the pressure drop responsive means only;

Figure 5 is a circuit diagram illustrating one manner in which the system may be operated automatically.

Figure 1:
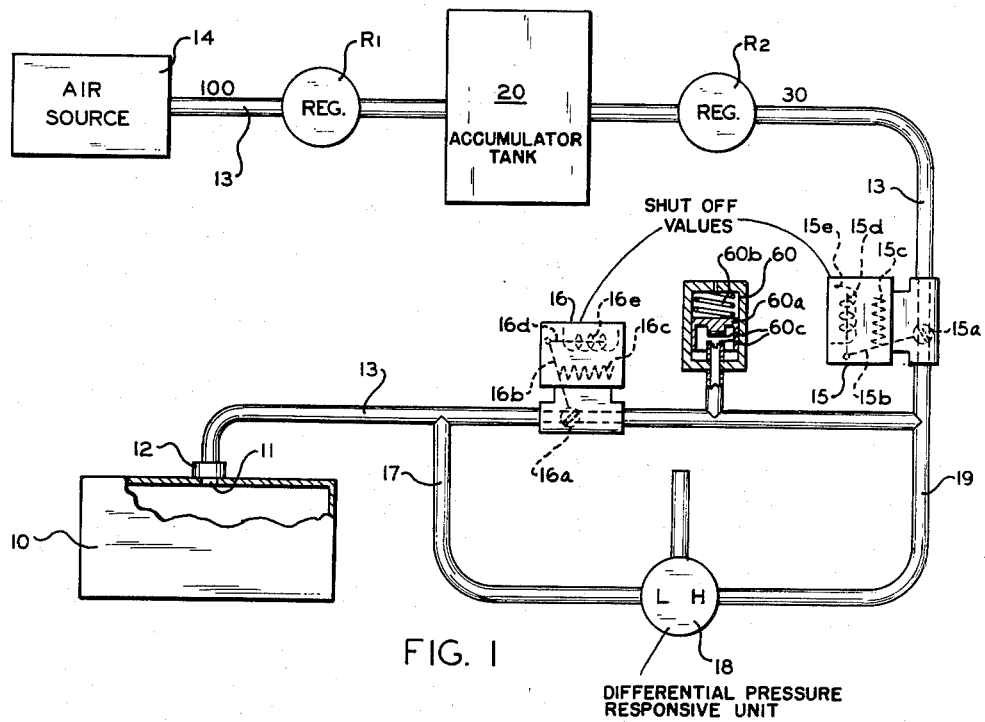
Figure 1 is a schematic diagram depicting our leak testing system.

Referring now more particularly to the accompanying drawings, wherein we have shown a preferred embodiment of the invention only, a numeral 10 generally indicates the part to be tested, which is shown as comprising a closed casing having an opening 11. A union 12 is provided at opening 11 for releasably securing a conduit 13 leading from a source of air pressure such as a compressor or the like 14, as shown, and, when shutoff valves 15 and 16 in line 13 are opened, line 13 will carry air or another suitable fluid under pressure normally measured in pounds per square inch from the source 14 to the part 10. A line 17 branches from the line 13 and leads to what will be termed the "low" side of a differential pressure responsive unit 18 which will later be described in detail.

Further, a line 19 communicating with conduit 13 leads to the opposite "high" side of the differential pressure responsive unit 18. The air being charged to part 10 need not be air under a precise pressure as in conventional systems of which we are aware, which require an exactly controlled reference pressure, however, means is provided in line 13 to insure that the air is supplied to the part 10 at substantially the charging pressure desired.

The air source, for instance, may be a compressor which is rated to furnish air at around 100 pounds p.s.i., however, the pressure of the air furnished varies considerably at different times. Thus, a conventional regulator R1 is provided in the line 13 between the compressor and an accumulator tank 20 and another regulator R2 is provided in the line 13 on the opposite side of accumulator tank 20. If it is desired that the test pressure be 30 p.s.i., then the regulator R1 can be set so that the temperature in accumulator tank 20 is maintained at about 32 p.s.i., for example, and regulator R2 will have no difficulty insuring that the air delivered to valve 15 is substantially 30 p.s.i.

The regulators R1 and R2 and the accumulator tank 20 are conventional units of any suitable type and a wide variety are commercially available for providing a relatively constant output pressure which is made available from a source such as a compressor. The valves 15 and 16 are conventional solenoid actuated air valves and the Sporlan solenoid valve model B632P manufactured by the Sporlan Company is well suited to use in the system as valves 15 and 16. For purposes of illustration the valves are shown as having rotatable valve elements 15a and 16a with passageways normally disaligned with the ports in the valve seat. Secured to these elements are handles 15b and 16b which are urged by springs 15c and 16c to rotate elements 15a and 16a to non-registering position. Armatures 15d and 16d attached to handles 15b and 16b are operatively associated with solenoids 15e and 16e so that upon energization of the solenoids the valves will be quickly opened. Air is initially charged to the part 10 at a time when valves 15 and 16 are open and after a time interval for filling of the part 10 valve 15 is closed. Shortly thereafter, valve 16 is closed, after permitting settling of the air in the part and then the difference in pressure in lines 17 and 19, if any, will be measured by the unit 18 during the remainder of a testing time period. The system which has been described is typical, however, a number of variations are possible wherein the valves are located differently but still operate in conjunction with the pressure responsive unit 18 in the same manner to impose a pressure drop on the unit 18 if there is a pressure drop in the system. The system is particularly adapted to respond to minute pressure drops in the part 10 to be tested due to loss of air through the walls thereof and is designed with means which effectively utilize a very minute pressure drop to operate a source of control pressure. The drop in pressure which occurs will normally be of a magnitude normally measured in inches of water. Unit 18 is made up of casing sections 21 and 22, secured together by means of bolts 23 or the like. A fluid filled diaphragm member 24, which preferably comprises a thin, metal outer wall 24a filled with a liquid silicone 24b, divides the chamber defined by mating sections 21 and 22 into a high side chamber 25 and a low side chamber 26. It will be seen that the line or conduit 17 is threaded into opening 27 communicating with the low side chamber 26 and the line or conduit 19 is threaded into an opening 28 in section 22 to communicate with the high side chamber 25.

Connected to the diaphragm member 24 by a yoke member 29 is an elongate bar 30 pivotally supported intermediate its ends by a diaphragm member 31 mounted on section 22. Section 30a outside the section 22 is of greater length than the section 30b extending within chamber 25. The bracket portion 32 secured on section 21 by bolts 31a mounts a nozzle 33 opposite a flapper 34 which is carried by a block 35 also connected to bar 30 by member 35a. Flapper 34 is secured by screws 34a to bracket 32. Provided on bracket 32 is a section 32a carrying a bellows 32b and a threaded member 32c mounting a spring 32d. The spring 32d is secured between adaptors 32e and 32f, the latter adaptor mounting a threaded range rod 32g having an adjusting nut 32h thereon. Bellows 32b is secured between members 32a and 32g by a nut as shown and the flange of nut 32h forms a fulcrum for range rod 32g. Nuts 33a permit ready adjustment of the nozzle 33 which has a threaded conduit portion leading to the nozzle orifice.

Provided in conjunction with the unit 18 is a relay 36 having a line 37 supplying it with a control fluid under a pressure which is normally measured in pounds per square inch. The relay 36 is shown as having a partition wall 38 separating its side walls 36a and 36b which are joined by bolts or the like 36c. A diaphragm member 39 is secured on one side of partition 38, the diaphragm member 39 having a central valve stem 40 extending through an enlarged lateral opening 41 in wall 38. A leaf spring 42 secured to partition 38 operates to urge valve stem 40 and diaphragm 39 outwardly in opposition to the pressure of the air in line 43 leading to nozzle 33 and passage "p" communicates supply line 37 with the line 43. Thus, when there is no pressure drop in the system and the flapper 34 is permitting the least obstructed egress of air from nozzle 33 so that the lowest pressure is maintained on the left side of diaphragm 39, the valve stem 40 is displaced outwardly to open the passage 41 fully at the point where it communicates with the right side of diaphragm 39 and much of the air from supply line 37 vents out the passage 44a. The remainder at reduced pressure proceeds through channel 44 in partition 38 to the output line 45. Feedback line 45a leads to bellows 32b as shown. The vent passage 44a in partition 38 communicating with the right side of diaphragm 39 is only substantially blocked by valve stem 40 from communication with passage 41 when there is a maximum pressure drop in the system. The range of pressures of the air in line 45 may preferably be between 3 to 15 p.s.i., so that at zero pressure drop in unit 18 the air in line 45 is at a pressure of 3 p.s.i. with flapper 34 spaced the maximum distance from nozzle 33 as in Figure 2. When the system is transmitting air through line 45 at a pressure of about 15 p.s.i., the flapper 34 is very slightly spaced from nozzle 33, so that, when there is a maximum obstruction to the air escaping, valve 40 is almost seated. If the flapper 34, bar 30, and diaphragm 24 are set so that a pressure differential or drop of 20 inches of water is the range over which measurement will take place, then when diaphragm 24 is in normal position, with the pressures in chambers 25 and 26 equal, flapper 34 will be at the point at which it is furthest from nozzle 33.

As an example of the type of operation which the system must perform, suppose that a pressure drop of ¼ inch of water in the part to be tested was critical. Translated into pounds per square inch, a pressure drop of ¼ inch water is .009 p.s.i. and, with an output range of 3 to 15 p.s.i. output pressure in line 45, a ¼ inch pressure differential results in a pressure of 3.15 p.s.i. in line 45. If 3 p.s.i. is zero, then the system is working with .15 p.s.i.

To transmit a pressure of this magnitude into an electrical signal requires a delicate instrument and the unit shown at 46 is designed so that it can be set to transmit an electrical signal when it receives a pressure of predetermined magnitude from line 45.

Figure 3:
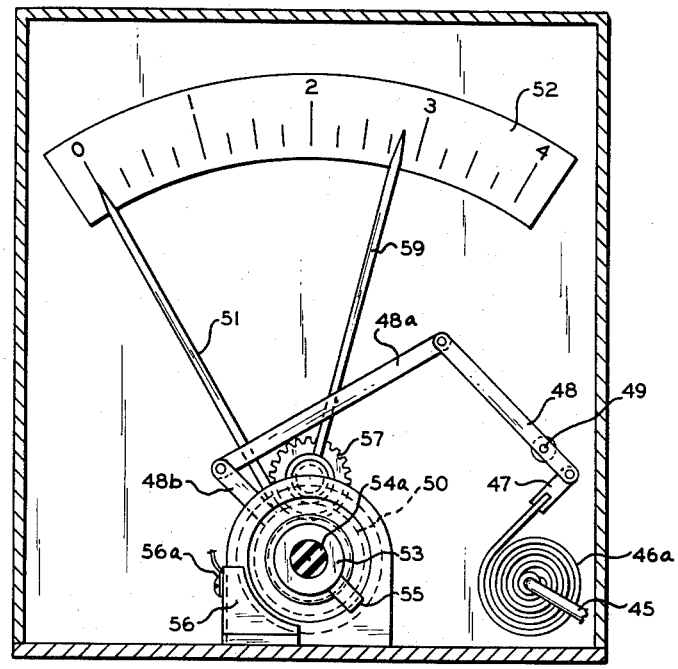
Figure 3 is a top plan view of the indicating means only.
Figure 4:
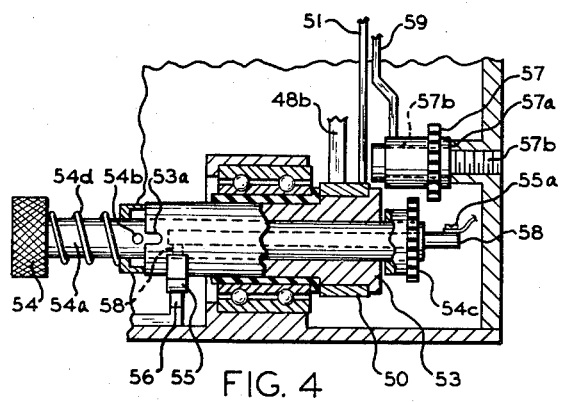
Figure 4 is a fragmentary, sectional, elevational view of certain elements of the indicating means.

In Figure 3 we have shown the control pressure line 45 leading to a spiral type Bourdon tube 46a which is secured by a plate 47 to a link 48 pivoted at 49. At its opposite end the linkage, comprising also pivotally connected links 48a and 48b, is rigidly connected to a sleeve member 50 as shown, and with expansion of Bourdon tube 46a, the sleeve 50 is rotated in a clockwise direction. A pointer 51 is secured to sleeve 50 and when the minimum amount of pressure (3 p.s.i.) is being transmitted through line 45 the pointer 51 will be in the zero position in which it is shown in Figure 3, at the extreme left end of the scale 52 which has appropriate indicia thereon. The unit 46 is designed so that it can be set to transmit an electrical signal when the pressure drop in unit 18 reaches a prescribed maximum and the apparatus described is typical of mechanism which could be employed. The insulated shaft 53, which is snugly received in the insulated sleeve 50, can be rotatably adjusted within sleeve 50 by means of a knob 54 on a shaft 54a which extends outside the wall of casing 46. The shaft 53 has a friction fit in sleeve 50, however, so that it will revolve with sleeve 50 upon movement of the linkage 48, 48a, and 48b. Carried by shaft 53 is a conductive insert segment 55 which, upon suitable rotation of sleeve 50, will come into engagement with the brush 56 stationarily mounted in casing 46. The shaft 53 is bored to freely receive the shaft 54a and has slots 53a to receive a pair of pins 54b therein. At its opposite end a gear 54c is fixed on shaft 54a and is engageable with a gear 57 fixed on a sleeve 57a which is snugly received on a pin 57b. The sleeve 57a is a friction fit on pin 57b but can be adjusted upon rotation of gear 57. Spring 54d normally maintains gears 54c and 57 out of mesh, however, if knob 54 is pushed inwardly and rotated to adjust the relative positions of insert 55 and segment 56 sleeve 57a will be rotated correspondingly by gears 54c and 57. The insert 55 is electrically connected to a central shaft 58 on which the terminal 55a is mounted and a terminal 56a is also provided on brush 56.

Provided on sleeve 57a is a pointer 59 which is fixed thereto so that the setting of shaft 53 and insert 55 can be accomplished with reference to the indicia on scale 52.

Lead wires connected to the terminals 55a and 56a, respectively, may be connected to a light or buzzer or the like, or could be connected to actuate a device which rejects a bad part.

The pointer 59 is, of course, initially set at the predetermined maximum pressure drop allowable for the part to be tested, and in so setting the pointer 59, the shaft 53 is adjusted with respect to sleeve 50 and insert 55 is adjusted with respect to brush 56. If sufficient pressure is applied to the Bourdon tube 46a through the control fluid pressure line 45, then sleeve 50 will be rotated sufficiently to bring shaft 53 and insert 55 into engagement with brush 56 and a signal light or the like will be energized so that it is known that the part does not meet the desired porosity standard.

In the event the part to be tested is exceptionally bad in the sense that it is quite open, it will not fill with air under pressure at all. Under these circumstances, the pressure responsive unit 18 would not indicate any pressure drop because the air charged would have simply escaped from the part. For this reason, a pressure switch 60 is provided in line 13 (see Figure 1) which has electrical contacts which are closed when the pressure in line 13 is below a predetermined pressure at a designated time. For instance, if the testing pressure in line 13 is normally maintained at substantially 30 p.s.i., then pressure switch 60 can be set so that it will energize the reject light if the pressure in line 13 drops below 25 p.s.i. In Figure 1 the pressure switch is shown for purposes of illustration as having a plate or diaphragm 60a urged inwardly by a spring 60b. The switch has contacts 60c as shown. The pressure switch, which is used, is of conventional design and may be a type C41, model 100, as manufactured by the United Electric Controls Company, of Watertown, Massachusetts.

In Figure 5 we have shown an electrical control system which illustrates the automatic operation of the system. Of course, valves 15 and 16 could be manually operated shut-off valves, however, it is preferable that they be electrically operated valves which are operated by timers. The timers which will be designated are electrically operated and may be of the type known as Eagle signal timers in the trade.

In Figure 5 we have shown current-carrying lines L1 and L2 connected to a power source 61. Provided in line "a" is a reject signal light 62, and the contacts 55a—56a of unit 46 are, of course, also in circuit line "a." The contacts 60c of the pressure switch 60 are in a circuit line "b" which is in parallel with line "a" and in series with light 62. Circuit line "c" has a push button 63 which the operator can use to start the test, and provided in circuit line "c" is the motor of a timer T1. In a parallel circuit c1 are the motors of four timers, T2, T3, T4, and T5. The timers run from the time the push button 63 is pressed until the end of the test, which may be a matter of ten seconds, for example. Timer T1 controls the other timers T2, T3, T4, and T5 in the system shown. Timer T2 is started at the time push button 63 is pressed and after a short time operates to close valve 15. Timer T3 is also started at the time push button 63 is pressed and operates to close valve 16 shortly after valve 15 is closed. Circuit line "d" shows the timer contacts of timer T2 in series with the solenoid valve 15 and the timer T3 has its contacts in series with the solenoid of valve 16 in circuit line "e." The contacts of timer T4 are in circuit line "b" and pressure switch 60 can energize light 62 then only during a particular time period. Timer T5 has its contacts in circuit line "a" in series with the contacts of unit 46 so that contacts 55a—56a can energize light 62 only during the desired period.

The electrical control system which has been illustrated is only exemplary of a system which may be used and clearly various variations thereof within the contemplation of the invention may be quite suitably employed to operate the system in the same way. The timers which we have shown for purposes of convenience of illustration are conventional and comprise simply motor driven cam wheels associated with microswitches in the usual manner. The conventional microswitches may comprise arms 64 pivoted at their inner ends which are urged into the recesses in the cams by springs 64a and one terminal is shown as mounted on the arm 64 and the other is shown as mounted on the wall of the microswitch.

Figure 6:
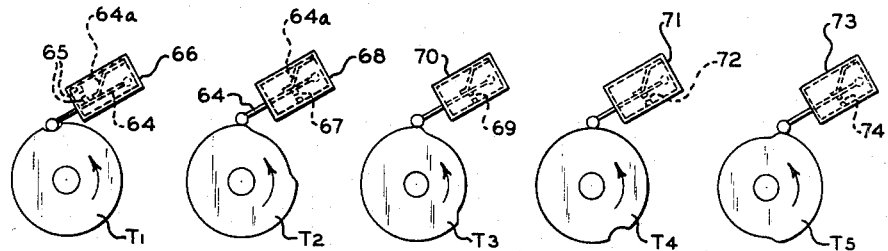
Figure 6 illustrates the operation of various timers which may be employed in the control of the system.

In the operation of the control system which is shown the push buttton 63 is first depressed to start timer T1 which closes the contacts 65 of timer T1 microswitch 66 (see Figure 6) and starts the motors of timers T2, T3, and T4. The timer cams are shown in Figure 6 as in the stopped position, and, of course, immediately upon rotation of the cam of timer T2 the contacts 67 of timer T2 microswitch 68 will be closed and valve 15 will be opened. Also, the contacts 69 of timer T3 microswitch 70 associated with the cam of timer T3 will be immediately closed and valve 16 will be likewise immediately opened. With the opening of these valves air is charged through conduit 13 to the part 10 to be tested and also to the low and high sides of the pressure drop responsive unit 18 through conduits 17 and 19, respectively. After the charging period, which may be a second and one half in duration, for instance, the cam of timer T2 will have been rotated sufficiently so that the terminals 67 of microswitch 68 are broken and valve 15 will instantly close. The charging air will then be permitted to settle for a short time, which may be about two seconds, perhaps, and thence the cam of timer T3 will have rotated sufficiently so that the terminals 69 of microswitch 70 are broken and valve 16 is closed. At this point the arm 64 of timer T4 microswitch 71 will drop into the recess in the cam of timer T4 and the contacts 72 of microswitch 71 will close so that if the contacts 60c of pressure switch 60 are likewise closed, light 62 will be energized. Immediately thereafter, the cam of timer T5 will have rotated sufficiently relative to the timer T5 microswitch 73 that contacts 74 are closed and the actual test period then runs from the time of closing of contacts 74 till the time when all of the cams are stopped in the position in which they are shown in Figure 6 by timer cam T1. For the sake of convenience, all the cams are shown as of equal diameter and as being driven at the same speed, and the microswitches are, of course, fixed in position. The push button 63 may be provided with a holding coil 63a operated from a circuit C2 connected with contacts 65. Thus, when push button 63 is pressed to start the cycle and contacts 65 are made, the push button 63 is held in depressed position by the holding coil 63a until completion of the cycle, whence the cam of timer T1 is back in the position in which it is shown in Figure 6, and, with breaking of the contacts 65 and deenergization of coil 63a, push button 63 is released and spring returned to "out" position. It will be seen that the pressure switch 60 is only operative during a short time after settling of the air in the part 10 and if the pressure is such that pressure switch 60 energizes the reject light 62 the part may be immediately discarded during the time the timers are returning to original position. Likewise, the actual test time is commenced only after settling of the air in the part 10 and the whole cycle time can be held to a minimum because the system does not hunt as do conventional diaphragm or bellows assemblies. In tests which have been conducted on various parts, the system compared with commercially available leak-testing systems as follows:

| | Applicants' System | Fastest Known Commercial System |
| --- | --- | --- |
| master cylinder | 6 seconds | 24 seconds. |
| hydraulic pump | 12 seconds | 45 seconds. |
| transmission case | 8 seconds | Impractical, due to large volume of air required. |

Applicants' combination, which includes a pivotally mounted bar 30 connected to a diaphragm 24 which operates the flapper and nozzle assembly 33—34 and through them the relay 36, provides a system which for practical purposes does not hunt, so that very little time is required for settling of the air in the system prior to taking the actual test. Because section 30b of the bar is shorter than section 30a of the bar 30, the movement of flapper 34 is, of course, magnified, although in direct proportion to the movement of the relatively heavy diaphragm 24. Further, adjustment of such a system including a flapper and nozzle assembly is very easily accomplished to accommodate to different test pressures which it may be desired to use.

Unit 36 through output branch line 45a produces in bellows 32b whatever pressure is necessary to maintain the baffle-nozzle assembly in its operative range, which is usually less than .001 inch. This pneumatic balancing system constrains the normal operating movement of bar 30 to a very small range, i.e., a movement of the same order of magnitude as that of baffle 34, and materially aids the force bar 30 in substantially eliminating any hunting effects.

Initially, the pointer 59 is, of course, set by pushing knob 54 inwardly as described until gears 54c and 57 come into engagement, whence knob 54 is rotated and pointer 59 is rotated from zero to the predetermined maximum pressure drop allowable for the particular part. Because sleeve 57a is a pressure fit on pin 57b, the needle or pointer 59 will remain in this position when spring 54d is permitted to return shaft 54a to "out" position. Rotation of shaft 54a, of course, as previously noted, with pins 54b within slots 53a, adjusts the position of sleeve 53 relative to sleeve 50 on the link 48b fixed thereto. In this way the angular position of insert 55 is varied with respect to the brush 56. If, during the testing cycle, the pressure in Bourdon tube 46a is sufficient so that link 48b moves sleeve 50 and thereby shaft 53 angularly a predetermined maximum distance, contact will be made between parts 55 and 56, and signal light 62 will be energized. The operation of the device will be readily understood from the foregoing and it is considered evident that the instant system is a considerable improvement over known leak testing systems.

With applicants' system there is no need to employ a precisely controlled, reference test pressure which is used as a base for determining pressure drop. Applicants use a test pressure of substantially 30 p.s.i. in some instances, although the system is adapted to use other pressures which could range above 1000 p.s.i. It is important to note that applicants' test pressure need not be exactly 30 p.s.i., however, since applicants are concerned with pressure drop only, rather than drop from a given reference pressure.

It is to be understood that various equivalent changes in the various parts to accomplish the same purpose may be made without departing from the spirit of the invention or the scope of the subjoined claims.

We claim:

1. In a pressure fluid leak testing system for indicating by the pressure drop in a hollow part whether the part meets a prescribed standard: a sealed casing portion having differential pressure responsive means mounted therein; fluid pressure supply means for supplying fluid under pressure; conduit means communicating said fluid pressure supply means with said part and differential pressure responsive means; first means in said conduit means for discommunicating the fluid pressure supply means; second means downstream of said first discommunicating means for blocking off the conduit means downstream of said first discommunicating means; means for communicating the conduit means between said first and second discommunicating means with one side of said differential pressure responsive means; means for communicating the pressure of the conduit means downstream of the second discommunicating means with the other side of said differential pressure responsive means; a pivotally supported, elongate bar having an internal section within the casing portion connected to said differential pressure responsive means so as to be pivoted thereby in response to a differential pressure measured in inches of water and an external section outside the casing portion; means pivotally supporting said bar intermediate its ends; a nozzle and baffle assembly connected to said bar to produce relative movement of said nozzle and baffle upon pivoting of said bar in response to a differential pressure; a pressure fluid control line containing a pressure measured in pounds per square inch; pressure control means connected to said nozzle and baffle assembly varying the pressure in said control line according to relative movement of the nozzle and baffle assembly; and fluid pressure operated means indicating when the differential pressure exceeds a predetermined value.

2. In a pressure fluid leak testing system for indicating by the pressure drop in a hollow part whether the part meets a prescribed standard: a casing portion having differential pressure responsive means mounted therein; fluid pressure supply means for supplying fluid under pressure; conduit means communicating said fluid pressure supply means with said part and differential pressure responsive means; first means in said conduit means for discommunicating the fluid pressure supply means; second means downstream of said first discommunicating means for blocking off the conduit means downstream of said first discommunicating means; means for communicating the conduit means between said first and second discommunicating means with one side of said differential pressure responsive means; means for communicating the pressure of the conduit means downstream of the second discommunicating means with the other side of said differential pressure responsive means; a movably supported, elongate bar having a section connected to said differential pressure responsive means so as to be moved thereby in response to a differential pressure; a nozzle and baffle assembly connected to said bar to produce relative movement of said nozzle and baffle upon movement of said bar in response to a differential pressure; a pressure fluid control line containing a pressure fluid; pressure control means connected to said nozzle and baffle assembly varying the pressure in said control line according to relative movement of the nozzle and baffle assembly; and fluid pressure operated means indicating when the pressure in said control line exceeds a predetermined value.

3. In a pressure fluid leak testing system for indicating by the pressure drop in a hollow part whether the part meets a prescribed standard: a casing having differential pressure responsive means mounted therein; fluid pressure supply means for supplying fluid under pressure; conduit means communicating said fluid pressure supply means with said part and differential pressure responsive means; first means in said conduit means for discommunicating the fluid pressure supply means; second means downstream of said first discommunicating means for blocking off the conduit means downstream of said first discommunicating means; means for communicating the conduit means between said first and second discommunicating means with one side of said differential pressure responsive means; means for communicating the pressure of the conduit means downstream of the second discommunicating means with the other side of said differential pressure responsive means; a movably supported, elongate bar having a section within the casing portion fixed to said differential pressure responsive means so as to be pivoted thereby in response to a differential pressure measured in inches of water; a nozzle and baffle assembly connected to said bar to produce relative movement of said nozzle and baffle upon pivoting of said bar in response to a differential pressure; a pressure fluid control line containing a pressure measured in pounds per square inch; pressure control means connected to said nozzle and baffle assembly and control line varying the pressure in said control line according to relative movement of the nozzle and baffle assembly; pressure responsive means connected to said nozzle and baffle assembly; means connecting the control line downstream of the pressure control means to said latter pressure responsive means, in a manner to impose the pressure thereof on said nozzle and baffle means in opposition to the relative movement of said nozzle and baffle means caused by said bar upon a pressure drop; and fluid pressure operated means connecting with said control line downstream of the pressure control means indicating when the differential pressure in said control line exceeds a predetermined value.

4. In a fluid leak testing system for indicating by the pressure drop in a hollow part whether the part meets a prescribed standard: a sealed casing portion mounting differential pressure responsive means, with opposite sides of said means isolated one from the other within said casing portion; testing fluid supply means for supplying testing fluid; conduit means communicating said testing fluid supply means with said part; said conduit means including line means communicating both sides of said differential pressure responsive means with said part; means for discommunicating one side of said pressure responsive means from said part to isolate said one side of said differential pressure responsive means from said part after a time interval permitting filling of the part; pivotally supported, elongate bar means having an internal part within the casing portion connected to said differential pressure responsive means so as to be pivoted thereby in response to a differential pressure measured in inches of water, and an external part outside the casing portion; means pivotally supporting said bar means intermediate its ends; a nozzle and baffle assembly connected to produce relative movement of said nozzle and baffle with pivoting of said bar means in response to a differential pressure; a pressure fluid control line containing a fluid under a pressure measured in pounds per square inch; pressure control means connected to said nozzle and baffle assembly for varying the pressure of the fluid in said control line according to relative movement of the nozzle and baffle assembly; and fluid pressure operated means indicating when the differential pressure exceeds a predetermined value.

5. In a fluid leak testing system for indicating by the pressure drop in a hollow part whether the part meets a prescribed standard: a casing portion having differential pressure responsive means, with opposite sides of said means isolated one from the other within said casing portion; testing fluid supply means for supplying testing fluid; conduit means communicating said fluid supply means with said part, said conduit means including line means communicating both sides of said differential pressure responsive means with said part; means for discommunicating one side of said pressure responsive means from said part to isolate said one side of said differential pressure responsive means from said part after a time interval permitting filling of the part; movably supported, elongate bar means having a section connected to said differential pressure responsive means so as to be moved thereby in response to a differential pressure; a nozzle and baffle assembly connected to said bar means to produce relative movement of said nozzle and baffle upon movement of said bar means in response to a differential pressure; a pressure fluid control line containing a pressure fluid; pressure control means connected to said nozzle and baffle assembly varying the pressure of the fluid in said control line according to relative movement of the nozzle and baffle assembly; and fluid pressure operated means indicating when the pressure of the fluid in said control line exceeds a predetermined value.

6. In a fluid leak testing system for indicating by the pressure drop in a hollow part whether the part meets a prescribed standard: a sealed casing portion mounting differential pressure responsive means, with opposite sides of said means isolated one from the other within said casing; fluid pressure supply means for supplying fluid under pressure; conduit means communicating said fluid pressure supply means with said part, said conduit means including line means communicating both sides of said differential pressure responsive means with said part; first means for discommunicating the fluid pressure supply means after a time interval for filling of the part; second means downstream of said first discommunicating means for discommunicating one side of said differential pressure responsive means from said part after said first means has discommunicated the fluid pressure supply means; pivotally supported, elongate bar means having an internal part within the casing portion connected to said differential pressure responsive means so as to be pivoted thereby in response to a differential pressure measured in inches of water, and an external part outside the casing portion; means pivotally supporting said bar means intermediate its ends; a nozzle and baffle assembly connected to the external part of said bar means to produce relative movement of said nozzle and baffle with pivoting of said bar means in response to a differential pressure; a pressure fluid control line containing a fluid under a pressure measured in pounds per square inch; pressure control means connected to said nozzle and baffle assembly varying the pressure of the fluid in said control line according to relative movement of the nozzle and baffle assembly; and fluid pressure operated means indicating when the differential pressure exceeds a predetermined value.

References Cited in the file of this patent
UNITED STATES PATENTS

| | | |
|---|---|---|
| 2,472,973 | Hoffman | June 14, 1949 |
| 2,807,167 | Stathan | Sept. 24, 1957 |
| 2,853,874 | Mennesson | Sept. 30, 1958 |
| 2,855,777 | Garrett | Oct. 14, 1958 |
| 2,872,806 | Mamzic | Feb. 10, 1959 |
| 2,902,149 | Blust | Sept. 1, 1959 |

Notice of Adverse Decision in Interference

In Interference No. 91,940 involving Patent No. 2,936,611, L. E. Le Mat and R. T. Sullivan, Leak testing system, final decision adverse to the patentees was rendered Aug. 29, 1963, as to claims 1, 2, 3, 4, 5 and 6.

[*Official Gazette November 12, 1963.*]